UNITED STATES PATENT OFFICE.

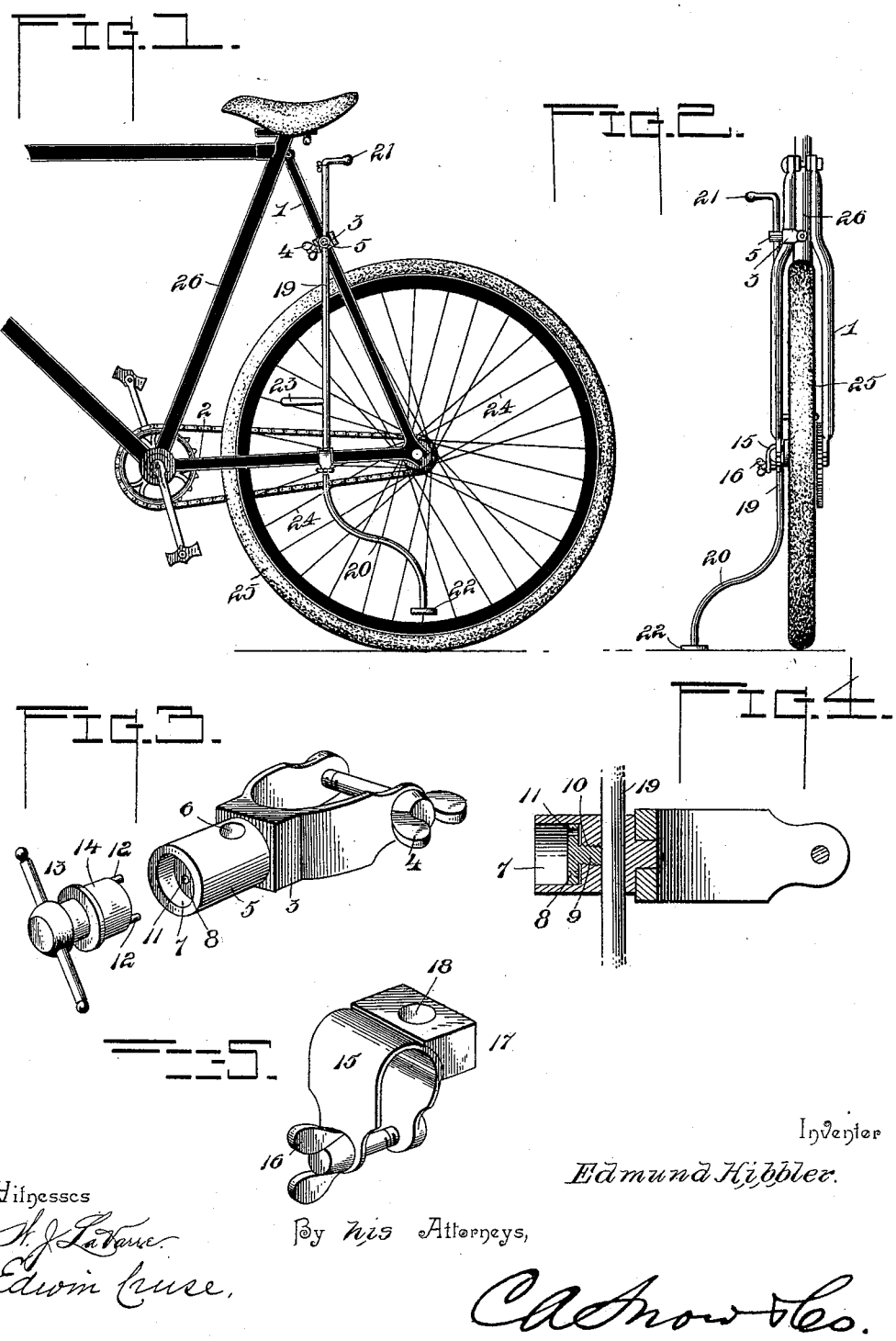

EDMUND HIBBLER, OF LEHIGHTON, PENNSYLVANIA.

BICYCLE-SUPPORT.

SPECIFICATION forming part of Letters Patent No. 595,946, dated December 21, 1897.

Application filed February 12, 1897. Serial No. 623,173. (No model.)

*To all whom it may concern:*

Be it known that I, EDMUND HIBBLER, a citizen of the United States, residing at Lehighton, in the county of Carbon and State of Pennsylvania, have invented a new and useful Bicycle Support and Lock, of which the following is a specification.

This invention relates to combined supports and locks for bicycles, the object being to provide a simple device of this character by means of which the bicycle may be supported in a vertical position when not in use and which also serves to lock one of the wheels against rotation in order that the bicycle cannot be wheeled off while the support is in operative position. The support when not in use may be elevated and turned in its bearings and then locked in this position in order that it will not interfere with the rider or project outwardly beyond the plane of the bicycle-frame.

With these ends in view the invention consists in the several details of construction and combination of parts hereinafter fully described, and particularly pointed out in the claim.

In the drawings, Figure 1 is a side elevation of a portion of a bicycle having my improvement attached thereto. Fig. 2 is an end view. Fig. 3 is a perspective view of one of the clip-bearings for the support detached and the key for operating the set-screw. Fig. 4 is a sectional view of the clip shown in Fig. 3. Fig. 5 is a perspective view of another clip-bearing detached.

Similar reference-numerals indicate similar parts in the several figures.

1 represents one of the rear-fork arms of an ordinary safety-bicycle, and 2 one of the bottom runs.

3 is a clip adapted to be fitted onto the fork-arm 1 at any point in its length and clamped in position by the thumb-screw 4. From the loop end of the clip extends a projection 5, which is provided with a transverse opening 6, and the outer end of the projection is bored out to form a socket 7 for the reception of the head 8 of a set-screw, the threaded shank 9 of which works in a threaded hole 10, extending from the inner end of the socket to the opening 6. The head 8 of the set-screw is provided with a series of perforations 11, adapted to receive the pins 12, which project from the end of the key 13, the stem 14 of which is shaped to fit in the socket 7 to turn freely therein. By the use of this key the set-screw can be easily turned to move it longitudinally.

15 represents a clip adapted to fit on the bottom run 2 and be clamped thereon by the thumb-screw 16. This clip is also provided with an extension 17, having an opening 18.

The support is indicated by 19 and consists of a metal rod having its lower end bent in ogee form, as indicated at 20. The straight portion of the support passes through the openings 6 and 18 in the projections on the clips and is adapted to have vertical movement therein. The upper end of the support is provided with a handle 21, removably attached thereto, by means of which the support may be moved vertically and also turned in its bearings. The lower end of the support is provided with a foot 22, which may be a simple disk or a fork or of any other form preferred, its function being to prevent the support from penetrating the ground. The support is also provided with a short arm 23, adapted when the support is in operative position to project between two of the spokes 24 of the wheel 25. The support extends down between the run 2 and the wheel, and when in its elevated position the curved lower end will be turned to lie parallel with the side of the wheel, and the support will be locked in position by the set-screw 9.

When the rider desires to support and lock the bicycle, the key 13 is inserted in the socket 7 and the pins 12 engaged with the perforations 11 in the head of the set-screw, and the latter may then be loosened to permit the support to be lowered until the foot 22 engages the ground and then be turned in its support to cause the arm 23 to project between two of the spokes, when the set-screw will be tightened up and thereby lock the support in this position. The bicycle will therefore be supported and at the same time the wheels will be locked against rotary movement.

The device is simple in construction and may be operated by the rider while seated on the saddle or when dismounted. The upper end of the support may be connected to the seat-post tube 26 instead of the fork member 1, if preferred, and other changes in the form, proportion, and minor details of construction may be resorted to without departing from the spirit or sacrificing any of the advantages of this invention.

Having thus described my invention, what I claim is—

The combination with a bicycle, of two clips secured to the frame, one above the other, each having a projection provided with a vertically-disposed opening, a supporting-rod extending through said vertically-disposed openings and adapted to have vertical and turning movement therein, the lower end portion of the support being bent and provided with a foot, and the upper straight portion having a short arm projecting from it and adapted to enter between two spokes of the wheel when the lower bent end of the rod is turned outwardly to its operative position, and a set-screw in one of the projections to lock the supporting-rod in position, substantially as described.

In testimony that I claim the foregoing as my own I have hereto affixed my signature in the presence of two witnesses.

EDMUND HIBBLER.

Witnesses:
T. J. SEIFERT,
ELIAS HOLLENBACK.